United States Patent [19]
Douken et al.

[11] Patent Number: 5,448,140
[45] Date of Patent: Sep. 5, 1995

[54] IMAGE DISPLAY APPARATUS WITH A DEFLECTION CIRCUIT HAVING FUNCTION FOR CORRECTING ROTATIONAL DISTORTION

[75] Inventors: Tomohiko Douken, Hitachi; Kikuo Tomita, Hitachiota, both of Japan

[73] Assignee: Hitachi, Ltd., Tokyo, Japan

[21] Appl. No.: 870,897

[22] Filed: Apr. 20, 1992

[30] Foreign Application Priority Data

Apr. 19, 1992 [JP] Japan .................. 3-088224

[51] Int. Cl.$^6$ ............... G09G 1/04; H01J 29/72
[52] U.S. Cl. ...................... 315/371; 315/393; 315/398
[58] Field of Search ........... 315/371, 398, 393, 395; 340/727

[56] References Cited

U.S. PATENT DOCUMENTS

| | | | |
|---|---|---|---|
| 2,574,946 | 11/1951 | White | 315/371 |
| 3,379,833 | 4/1968 | Hecker et al. | 358/93 |
| 3,803,445 | 4/1974 | Wagner | 315/393 |
| 4,198,591 | 4/1980 | Ohmori | 315/371 |
| 4,337,419 | 6/1982 | Holzgrafe | 315/371 |
| 4,893,065 | 1/1990 | Yamanaka | 315/371 |
| 5,077,501 | 12/1991 | Hartmann et al. | 315/371 |

Primary Examiner—Gregory C. Issing
Attorney, Agent, or Firm—Antonelli, Terry, Stout & Kraus

[57] ABSTRACT

A first modulating wave current synchronized with a vertical sync signal and, having the same period as the vertical sync signal, is superposed on a horizontal deflection current caused to flow through a horizontal deflection coil of a CRT, and a second modulating wave current synchronized with a horizontal sync signal and, having the same period as the horizontal sync signal, is superposed on a vertical deflection current caused to flow through a vertical deflection coil of the CRT. The polarity and the amplitude of each of the first and second modulating wave currents are controlled by an adjustment circuit to correct a rotational distortion of a display area with respect to the displayed position of this area.

8 Claims, 9 Drawing Sheets

(a) SYNC SIGNAL H.V (b) OUTPUTS $S_1, S_2$ FROM INTEGRATORS 12A, 14A (c) OUTPUTS HC, VC FROM MULTIPLIERS 12B, 14B ($K_1, K_2 > 0$)

(d) OUTPUTS HC, VC FROM MULTIPLIERS 12B, 14B ($K_1, K_2 < 0$)

FIG. 8A (a) HORIZONTAL SYNC SIGNAL H (b) HORIZONTAL DEFLECTION CURRENT HS0 (UNMODULATED) — 12App (c) VERTICAL SYNC SIGNAL V (d) HORIZONTAL DEFLECTION MODULATING WAVE SIGNAL HM — 0.1App (e) HORIZONTAL DEFLECTION CURRENT HS (MODLATED) — 0.1App

IMAGE DISPLAY APPARATUS WITH A DEFLECTION CIRCUIT HAVING FUNCTION FOR CORRECTING ROTATIONAL DISTORTION

BACKGROUND OF THE INVENTION

This invention relates to an image display apparatus, such as a display using a cathode ray tube (CRT) or a television receiver, and, more particularly, to an image display apparatus having a deflection circuit having a function for correcting a rotational distortion of an image frame on the CRT.

With the development of microprocessors, many image display apparatuses such as CRT displays have been used in the field of CAD, CAM, work stations and the like. There is now an increased demand for CRT display apparatuses having improved accuracy, in particular for those which are used to process diagrams and drawings correctly and accurately, and there is a need to display an image in a predetermined correct position.

An image display apparatus using a CRT is constructed in such a manner that the CRT is fixed by being mounted on a rectangular frame, and a rectangular facing frame called a bezel is attached at a front outer edge of the CRT. Images are ordinarily displayed in a rectangular display area (raster area) set inside the bezel frame.

If, at the time of assembly of such a display screen portion, the CRT and the bezel are mounted without being correctly positioned relative to each other in accordance with design criteria, the display area is shifted from the bezel frame in a horizontal or vertical direction or is rotated relative to the bezel frame. In such a case, there is the problem of a displayed content in a peripheral portion of the display area being hidden behind the bezel or the problem of a feeling of unnaturalness in viewing a displayed image.

Even after the display apparatus has been assembled, an error in positioning the display area in a horizontal or vertical direction can easily be corrected by a method conventionally practiced, i.e., a method of adjusting a DC component of a deflection current through the horizontal or vertical deflection coil so that the center of the display area coincides with the center of the bezel frame.

However, a phenomenon in which the display area is rotated relative to the bezel frame (hereinafter referred to as rotational distortion) cannot be corrected easily. That is, after the assembly of the image display apparatus, the CRT is energized to display an image to confirm the existence of a rotational distortion and the degree of distortion. Next, the image display is temporarily put off and the bezel attachment screws are loosened to adjust the mount angle. Thereafter, the screws are turned to fasten the bezel and the CRT is energized again to display the image and to check the rotational distortion. It is necessary to repeat these operations to correct the distortion, and the efficiency of this process is very low.

There is a possibility of rotational distortions due to an error in setting the deflection yoke mount angle and the influence of earth magnetism, as well as the above-mentioned distortion due to an error in the relative position of the CRT and the bezel. Further, rotational distortion can be caused as rotation of only one of the horizontal and the vertical axes of the display area, i.e., a parallellogramatic distortion, as well as rotation the display area as a whole.

A method is disclosed in Japanese Utility Model Laid-Open Publication Hei 2-67549 as a method correcting such rotational distortions in a simple manner. In this method, coils for removing rotational distortions are provided on a deflection yoke, and currents flowing through the coils are controlled to correct rotational distortions.

However, this method requires a deflection yoke provided with special rotational distortion correcting coils and, therefore, increases the manufacture cost of the display considerably.

Similar problems are also encountered in the case of television receivers. That is, a displayed content in a peripheral portion of the display area may be hidden behind the bezel or an axis of an image to be displayed horizontally or vertically, and the image may be inclined so that the viewer views the image as being unnatural.

SUMMARY OF THE INVENTION

An object of the present invention is to provide a rotational distortion correction method for removing rotational distortions in the frame on a CRT display without using rotational distortion correcting coils. The present method is applied to a CRT deflection circuit, and the invention further proves an image display apparatus having such a deflection circuit.

In accordance with the present invention, rotational distortion is treated by being decomposed into parallelogramatic distortions, each of which is caused in such a manner that one of horizontal and vertical axes of the display area is inclined relative to a referential axis of the bezel frame. The inclinations of the horizontal and vertical axes of the display area are corrected by adjusting vertical and horizontal deflection currents, as described below.

First, to correct the inclination of the horizontal axis of the display area, a first saw-tooth current synchronized with a horizontal sync signal and having the same period as the horizontal sync signal is superposed on a saw-tooth vertical deflection current which is caused to flow through the vertical deflection coil of the CRT. That is, a saw-tooth current having a shorter period coinciding with the period of the horizontal sync signal is superposed on the saw-tooth vertical deflection current, and an electron beam is scanned while being swung to a constant amplitude in the vertical direction with respect to each horizontal scanning line by the superposed shorter-period saw-tooth wave. In this phenomenon, with respect to horizontal scanning of the electron beam, each horizontal scanning line is inclined relative to the reference horizontal axis to an extent corresponding to the extent to which the electron beam is swung in the vertical direction. The direction and the angle of this inclination depend upon the polarity and the amplitude of the superposed modulating wave. Consequently, it is possible to correct the inclination of the horizontal axis of the display area by controlling the polarity and the amplitude of the superposed modulating wave current according to the direction and the extent of inclination of the horizontal axis of the display area relative to the referential horizontal axis.

To correct the inclination of the vertical axis of the display area, a second saw-tooth current synchronized with a vertical sync signal and having the same period as the vertical sync signal is superposed on a saw-tooth horizontal deflection current caused to flow through the horizontal deflection coil of the CRT. Of a plurality of horizontal scanning lines of the electron beam is successively displaced in the horizontal direction by the superposed longer-period saw-tooth wave according to the amplitude of the modulating wave, as in the case of the above-described correction of the horizontal axis inclination. The vertical axis of the display area is thereby inclined by a certain angle. The direction and the angle of this inclination depend upon the polarity and the amplitude of the superposed modulating wave. Consequently, it is possible to correct the inclination of the vertical axis of the display area by controlling the polarity and the amplitude of the superposed modulating wave current according to the direction and the extent of inclination of the vertical axis of the display area relative to the reference vertical axis.

The above two correction methods may be combined to correct rotational distortion. The rotational distortion correction method of the present invention can be realized by constructing a CRT deflection circuit as described below.

A CRT deflection circuit in accordance with the present invention has a horizontal deflection circuit for supplying a saw-tooth horizontal deflection current to a horizontal deflection coil of a CRT in synchronization with a horizontal sync signal, a vertical deflection circuit for supplying a saw-tooth vertical deflection signal to a vertical deflection coil of the CRT in synchronization with a vertical sync signal, a first modulating wave generation circuit for generating a first saw-tooth modulating wave signal synchronized with the horizontal sync signal and having the same period as the horizontal sync signal, a first adjustment circuit for variably setting the polarity and the amplitude of the first modulating wave signal, a second modulating wave generation circuit for generating a second saw-tooth modulating wave signal synchronized with the vertical sync signal and having the same period as the vertical sync signal, and a second adjustment circuit for variably setting the polarity and the amplitude of the second modulating wave signal. The vertical deflection current is modulated by the first modulating signal while the horizontal deflection current is modulated by the second modulating wave signal.

The horizontal deflection circuit may have a horizontal centering circuit for adjusting a horizontal center of a displayed image by controlling a grounded-side potential of the deflection soil. In this case, a control output from this horizontal centering circuit is modulated with the second modulating wave signal to modulate the horizontal deflection signal.

Each of the first and second modulating wave generating circuits can be constituted of a saw-tooth wave generation circuit for generating a saw-tooth wave synchronized with the horizontal or vertical sync signal and having the same period as this sync signal, and a multiplier for multiplying an output from this saw-tooth wave generation circuit by a coefficient.

The first and second adjustment circuits can be provided integrally with each other. In this case, an adjustment circuit can be arranged by including a coefficient generation circuit for generating variable-level coefficient signals having polarities, and a coefficient distribution circuit for outputting coefficients to the multipliers through switches and adjustment resistors. Preferably, a variable resistor is provided as each of these adjustment resistors to optimize adjustment with respect to variations in the extent of inclination of the horizontal/vertical axis and variations in the ratio of vertical and horizontal dimensions of the display area.

Parallelogramatic distortions and rotational distortions of a CRT display apparatus or a TV receiver can be removed by using the deflection circuit in accordance with the present invention.

BRIEF DESCRIPTION OF THE DRAWINGS

FIGS. 7A and 7B are diagrams of correction of rotational distortion which is caused in such a manner that the horizontal axis of the display area is rotated symmetrically relative to a referential horizontal axis;

FIGS. 8A and 8B are diagrams of correction of a parallellogramatic distortion which is caused in such a manner that the vertical axis of the display area is rotated relative to a referential vertical axis;

DESCRIPTION THE PREFERRED EMBODIMENT

An embodiment of the present invention will be described below with reference to the accompanying drawings.

Figure 1:
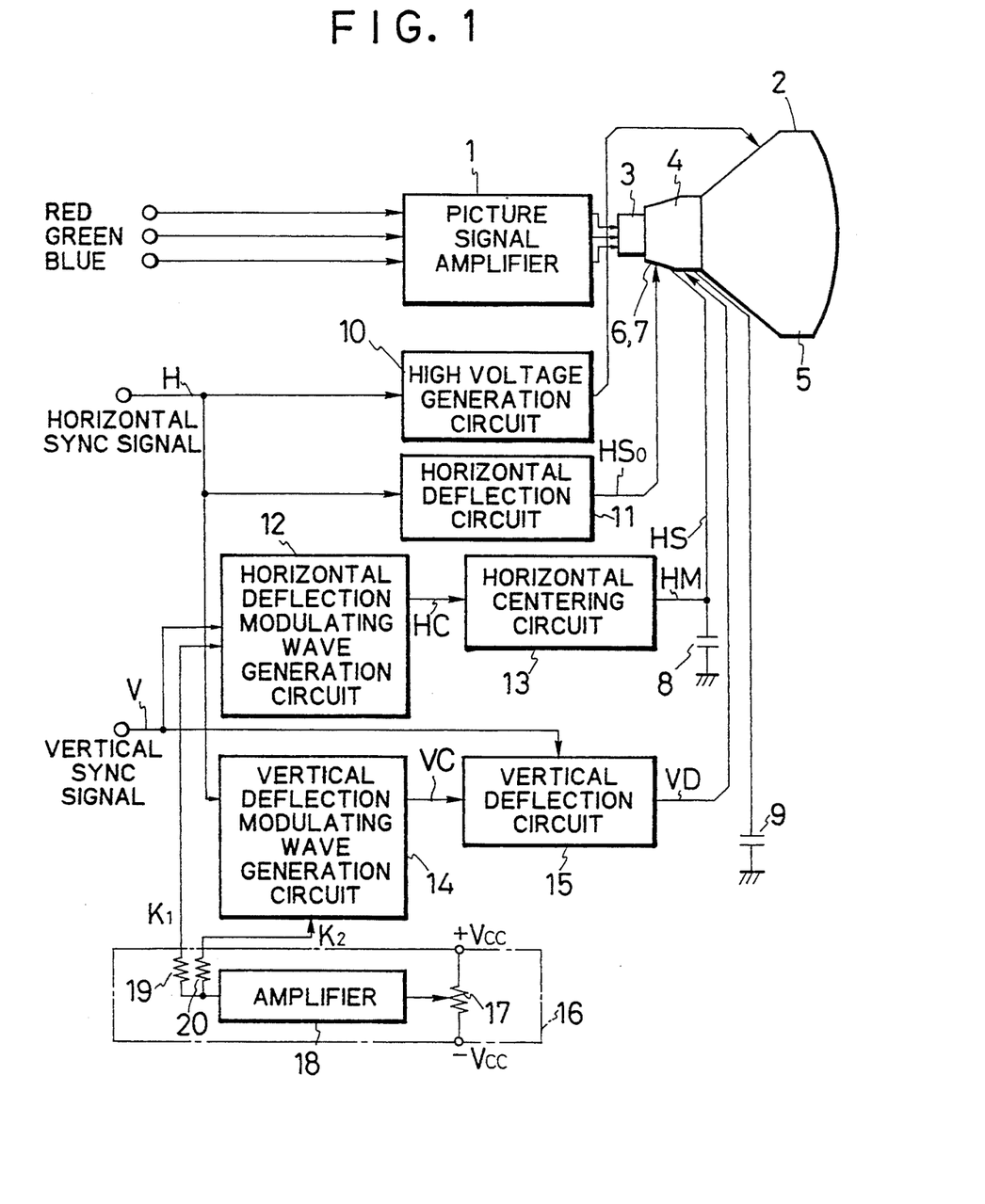
FIG. 1 is a block diagram of the construction of an image display apparatus in accordance with an embodiment of the present invention.

FIG. 1 shows an image display apparatus in accordance with an embodiment of the present invention. A rotational distortion correction method of the present invention is applied to this image display apparatus. The image display apparatus in accordance with this embodiment is a display apparatus using a CRT.

Image data (RED, GREEN, BLUE) is supplied to a picture signal amplifier 1 in synchronization with clock pulses synchronized with a horizontal sync signal (pulse) H. The picture signal amplifier 1 amplifies the supplied image data to a predetermined voltage and outputs the data to an electron gun of a CRT 2. A deflection yoke 4 for deflecting electron beams emitted from the electron gun is provided on a neck portion of the CRT 2. A horizontal deflection coil 6 for scanning by deflecting the electron beams in a horizontal direction of a CRT screen 5 and a vertical deflection coil 7 for scanning by deflecting the electron beams in a vertical direction of the CRT screen 5 are wound around the deflection yoke 4. One of each of the deflection coils 6 and 7 is grounded through a capacitor 8 or 9. A high voltage generation circuit 10 generates an anode voltage (e.g., 27 kV) for the CRT 2 based on the horizontal sync signal H supplied to this circuit.

The arrangement of a deflection circuit relating to features of the present invention will be described below. The deflection circuit includes a horizontal deflection circuit 11, a horizontal deflection modulating wave generation circuit 12, a horizontal centering circuit 13, a vertical deflection modulating wave generation circuit 14, a vertical deflection circuit 15 and an adjustment circuit 16. The horizontal deflection circuit 11 is arranged to cause a horizontal deflection current $HS_0$ having a reference waveform flow through the horizontal deflection coil 6 based on the horizontal sync signal H, as is well known. The horizontal centering circuit 13 is basically arranged to control the voltage of a ground-side terminal of the horizontal deflection coil 6 and, hence, a center level of the saw-tooth horizontal deflection current, as is well known. It is thereby possible to move and adjust the horizontal center of the display area in the horizontal direction. The vertical deflection circuit 15 is arranged to cause a vertical deflection current VD having a reference waveform flow through the vertical deflection coil 7 based on a vertical sync signal (pulse) V, as is well known. A vertical centering circuit is incorporated in the vertical deflection circuit 15 although it is not illustrated.

The horizontal deflection modulating wave generation circuit 12 generates a saw-tooth modulating wave signal HC synchronized with the vertical sync signal V and having the same period as the vertical sync signal V. The polarity of the modulating signal HC can be inverted and also the amplitude of this signal can be adjusted. The vertical deflection modulating wave generation circuit 14 generates a saw-tooth modulating wave signal VC synchronized with the horizontal sync signal H and having the same period as the horizontal sync signal H. The polarity of the modulating signal VC can be inverted and also the amplitude of this signal can be adjusted. The polarity and the amplitude of each of the modulating wave signals HC and VC can be changed and set by the adjustment circuit 16o The adjustment circuit 16 is arranged by including a slide resistor 17 connected to operating power supplies +Vcc and −Vcc, an amplifier 18 for amplifying a voltage output from the resistor 17, and output resistors 19 and 20 connected to an output terminal of the amplifier 18. Signals $K_1$ and $K_2$ for controlling the polarity and the amplitude of the modulating waves are respectively output to the horizontal deflection modulating wave generation circuit 12 and the vertical deflection modulating wave generation circuit 14 through the output resistors 19 and 20. That is, the polarity and the amplitude of the modulating waves HC and VC are adjusted by changing the position of a slider of the slide resistor 17. The resistors 19 and 20 serve to adjust the extents of movement of the display area in the horizontal and vertical directions. For example, the ratio of the signals $K_1$ and $K_2$ is set in accordance with the ratio of vertical and horizontal dimensions of the display area. Variable resistors may be used as resistors 19 and 20.

Figure 2:
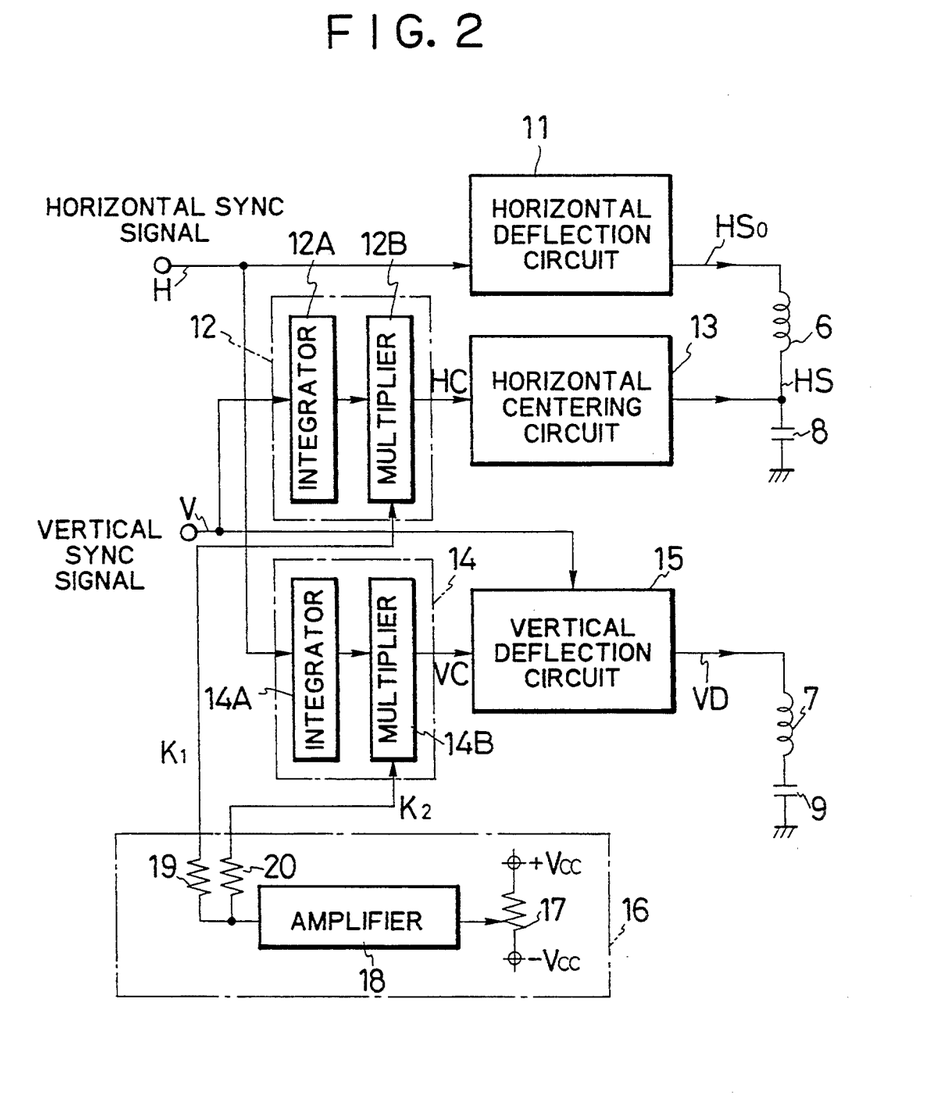
FIG. 2 is a block diagram of a deflection circuit in accordance with the embodiment of an present invention.
Figure 3:
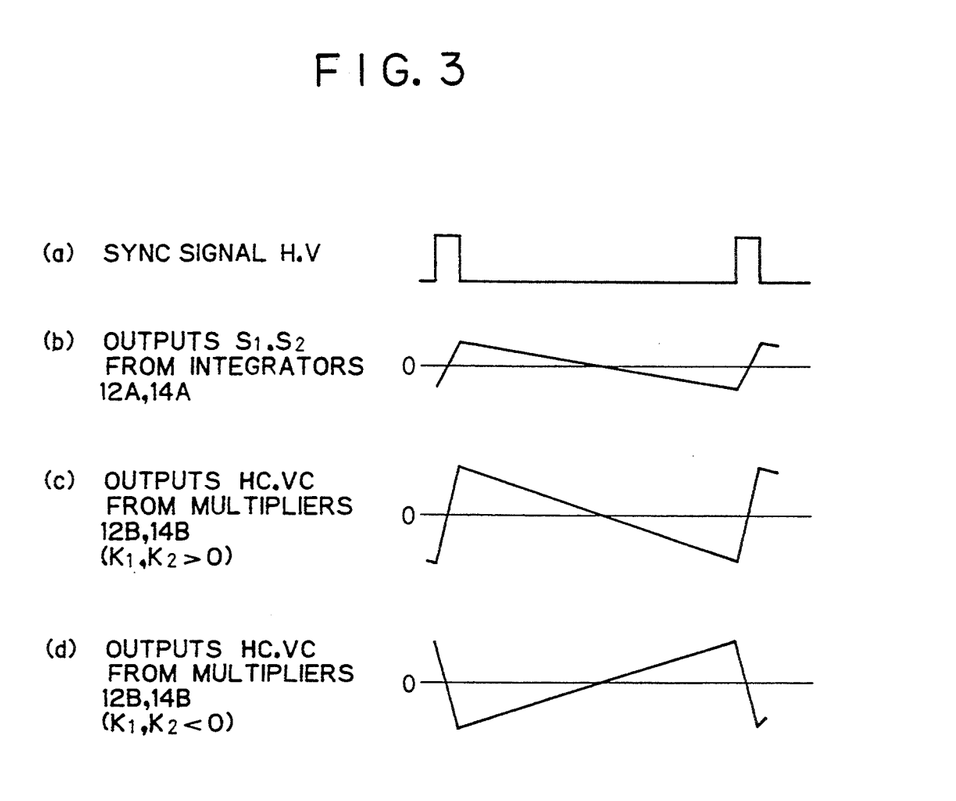
FIG. 3 is a diagram of signal waveforms at different positions in a horizontal/vertical deflection modulating wave generation circuit.

FIG. 2 shows examples of the horizontal deflection modulating wave generation circuit 12 and the vertical deflection modulating wave generation circuit 14. As illustrated, each of these circuits is constituted of an integrator 12A and 14A and a multiplier 12B and 14B, respectively. Referring then to FIG. 3, the integrator 12A or 14A integrates pulses of the input sync signal H or V shown in (a) of FIG. 3 to output saw-tooth signal S1 or S2 having a waveform such as that shown in (b) of FIG. 3. The saw-tooth signals S1 and S2 have a waveform such as to have the same amplitude on the plus and minus sides of the zero level. Each saw-tooth signal $S_1$ or $S_2$ is multiplied by a coefficient $K_1$ or $K_2$ in the multiplier 12B or 14B to output a modulating wave signal HC or VC having a polarity and an amplitude shown in (c) or (d) of FIG. 3. The waveform shown in (c) of FIG. 3 is obtained when the coefficient $K_1$ or $K_2$ is positive, and the waveform shown in (d) of FIG. 3 is obtained when the coefficient $K_1$ or $K_2$ is negative.

The operation for correcting rotational distortions in the thus-constructed embodiment will be described below.

Figure 4:
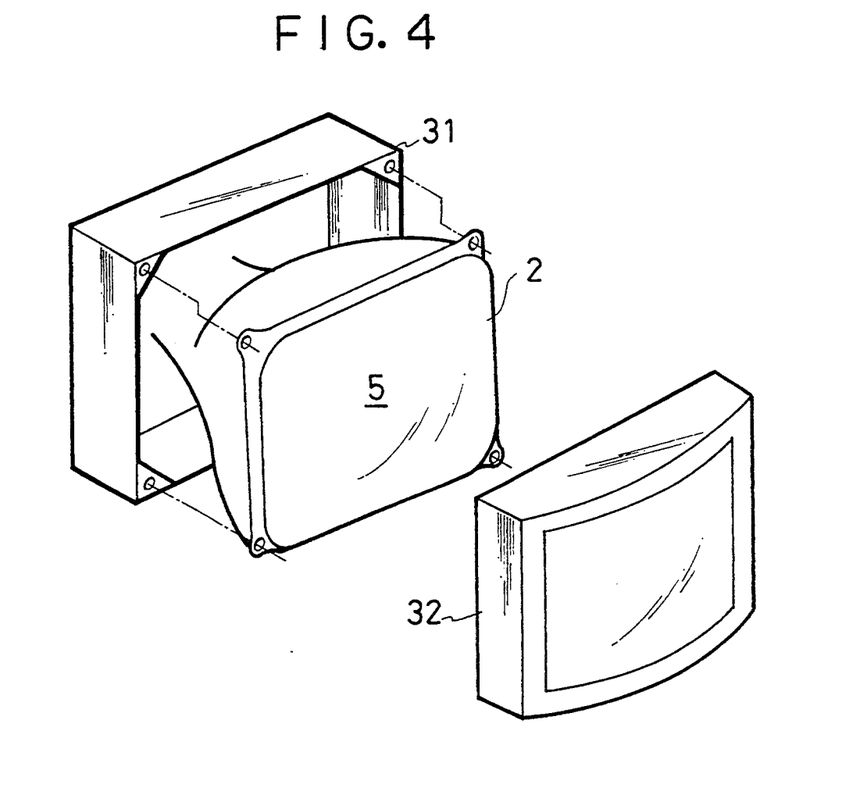
FIG. 4 is an exploded perspective view of the structure of a screen portion of the CRT display.
Figure 5:
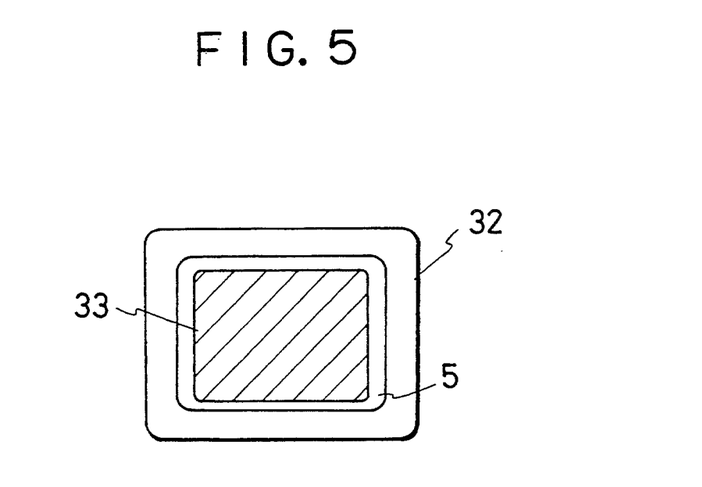
FIG. 5 is a diagram of the relationship between a bezel of the image display apparatus and a display area.
Figure 6:
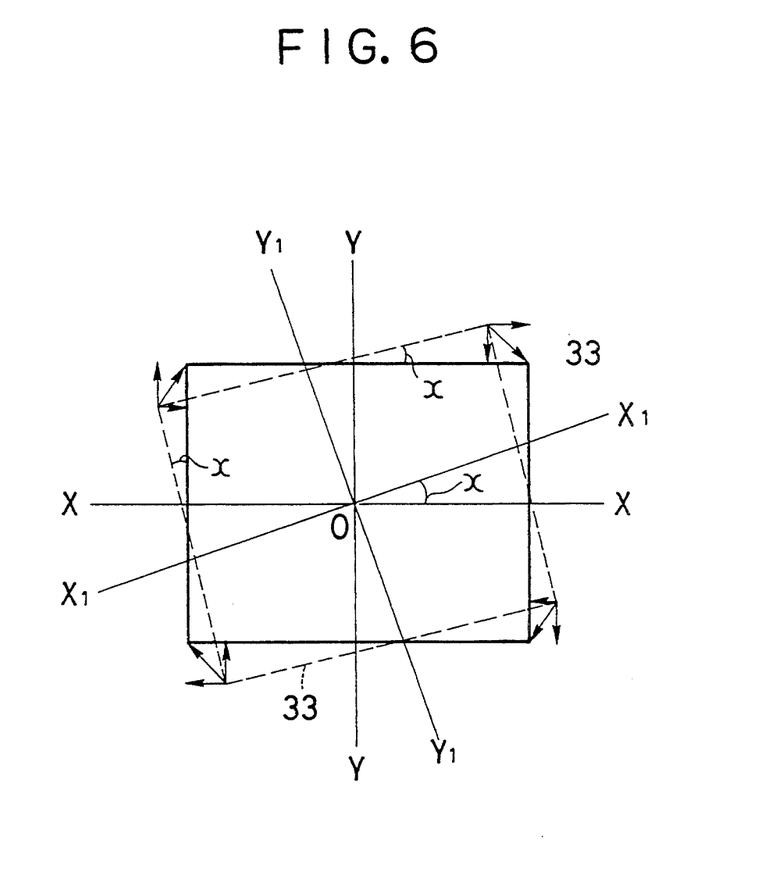
FIG. 6 is a diagram of the relationship between an ideal displayed position of the display area and a state in which the display area has a rotational distortion.

First, examples of occurrence of rotational distortions will be described with reference to FIGS. 4, 5, and 6. A display screen unit of the CRT display apparatus is constituted of a CRT 2, a frame 31 on which the CRT 2 is mounted, and an outer frame member of a housing which member is called bezel 32, and which is attached on a front side of the CRT 2. Ordinarily, the periods of the horizontal sync signal H and the vertical sync signal V are set so that a display area (raster area) 33 is fitted in an area inside frame defined by the bezel 32. This is because if the display area 33 is set so as to fit to the frame of the bezel 32, there is a possibility of the size or the position of the display area 33 being changed by a deflection current drift or the like due to a change in ambient temperature or other causes so that a peripheral portion of the display area 33 is hidden behind the bezel 32, and also because it is necessary to previously set the size of the display area to enable accurate diagrams or drafts to be displayed.

If the position at which the bezel 32 is attached to the CRT 2 is deviated from the correct position, the position of the display area 33, with respect to the frame of the bezel 32, is relatively shifted so that a peripheral portion of the display area 33 is hidden behind the bezel 32 and the viewer would sense an image abnormality or have difficulty in viewing the image. If such a positional error occurs in the horizontal or vertical direction alone, it can be corrected by adjustment using the above-mentioned horizontal centering circuit 13 or the vertical centering circuit incorporated in the vertical deflection circuit 15. However, there is a possibility of the bezel 32 being mounted in a relationship with an ideal position indicated by the solid line in FIG. 6, i.e., rotated on a screen center O, for example, by an angle x as indicated by the broken line. That is, if the bezel 32 is mounted in a position such as to be rotated by an angle −x relative to a referential horizontal axis X—X and a referential vertical axis Y—Y of the display area 33, a distortion similar to a rotational distortion is exhibited.

Also, a rotational distortion may be caused by an error in setting the angle at which the deflection yoke 4 of the CRT 2 is mounted. That is, if the deflection yoke 4 is mounted while being rotated on the screen center relative to the screen 5 of the CRT 2, the direction of electron beam deflection is correspondingly rotated. In this case, the display area 33 is also displayed in a position such as that indicated by the broken line in FIG. 6 by being rotated on the screen center O. To remove such a rotational distortion, the deflection yoke mount angle may be adjusted. However, this adjustment is difficult because there is a risk of an electrical shock during adjustment which is necessarily effected while the CRT is being energized.

Figure 7A:
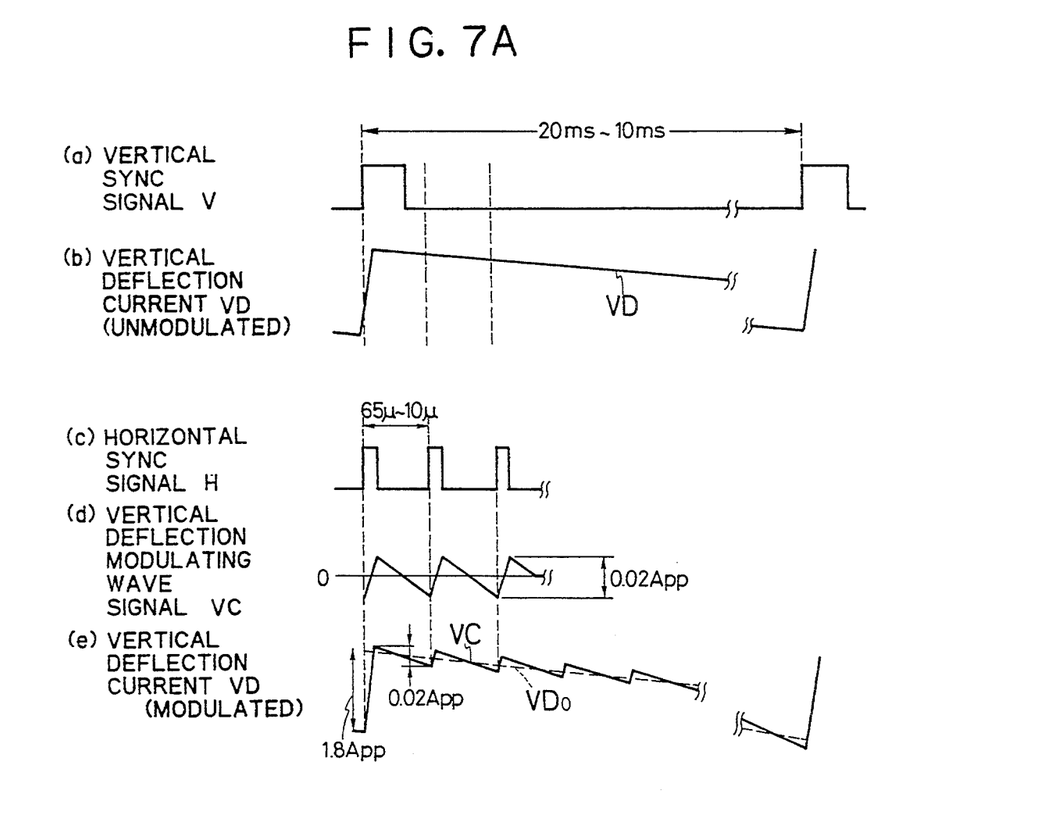
FIG. 7A is a diagram of waveforms at different circuit points, showing the operation of modulating a vertical deflection current.
Figure 7B:
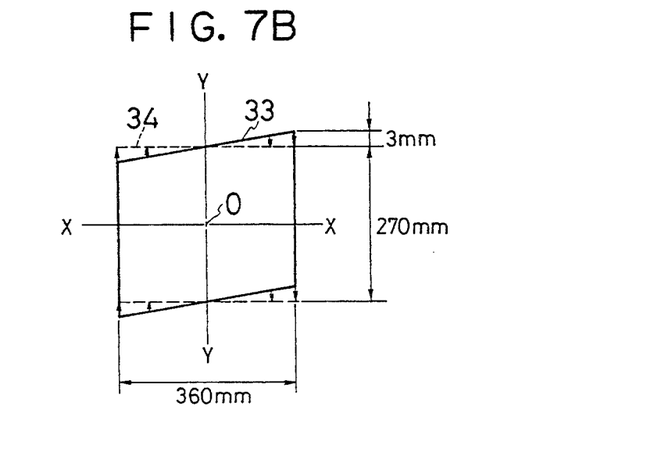
FIG. 7B is a diagram showing a displayed state of the display area.

The operation for correcting such rotational distortions in the embodiment shown in FIGS. 1 and 2 will be described below with reference to waveform diagrams of FIGS. 7A, 7B, 8A, and 8B. FIGS. 7A and 7B are diagrams of correction of rotational distortion which is caused in such a manner that the horizontal axis of the display area is rotated symmetrically relative to the referential horizontal axis X—X. FIG. 7A is a diagram of waveforms at different circuit points, showing the operation of modulating the vertical deflection current VD. FIG. 7B is a diagram showing a displayed state of the display area 33. In this case, as illustrated in FIG. 7B, a parallellogramatic distortion is caused in such a manner that the display area 33 having a 270 mm vertical side and a 360 mm horizontal side is distorted in the vertical direction so as to have a deviation of 3 mm at a horizontal end position. This distortion can be removed by modulating the vertical deflection current VD.

That is, if vertical sync signal V formed of a pulse signal having a constant period (e.g., of 20 to 10 ms) as shown in (a) of FIG. 7A is input to the vertical deflection circuit 15, the vertical deflection circuit 15 outputs deflection current $VD_O$ having a saw-tooth referential waveform shown in (b) of FIG. 7A based on the vertical sync signal V. If horizontal sync signal H formed of a pulse signal having a constant period (e.g., of 65 to 10 $\mu$s) as shown in (c) of FIG. 7A is input to the vertical deflection modulating wave generation circuit 14, the vertical deflection modulating wave generation circuit 14 outputs modulating wave signal VC having a saw-tooth waveform such as that shown in (d) of FIG. 7(A). The amplitude of this modulating wave signal VC is adjusted, for example, to 0.02 App in terms of peak-to-peak level in correspondence with the above-mentioned inclination of 3 mm. This adjustment is effected by operating the slide resistor 17 of the adjustment circuit 16 so as to set a desired value of coefficient $K_2$. The modulating wave signal VC shown in FIG. 7A is controlled to have the polarity shown in (d) of FIG. 7A by setting a positive value of coefficient $K_2$. In a case where the horizontal axis is inclined in the opposite direction, coefficient $K_2$ may be set to a negative value to invert the polarity of the waveform shown in (d).

The modulating wave signal VC thus generated is supplied to the vertical deflection circuit 15, and the deflection current $VD_O$ having the above-mentioned reference waveform is modulated by the modulating wave signal into a waveform, such as that shown in (e) of FIG. 7A, in which the modulating wave is superposed. Electron beams are thereby scanned while being swung to a constant amplitude in the vertical direction with respect to each horizontal scanning line by the superposed shorter-period saw-tooth wave. In this phenomenon, with respect to horizontal scanning of an electron beam, each horizontal scanning line is rotated relative to the referential horizontal axis to an extent corresponding to the extent to which the electron beam is swung in the vertical direction, as indicated by the arrows in FIG. 7B, thereby removing the parallellogramatic distortion. The direction and the angle of this rotation depend upon the polarity and the amplitude of the superposed modulating wave. Consequently, it is possible to correct the inclination of the horizontal axis of the display area 33 by selecting $K_2$ for the desired polarity and amplitude of the superposed modulating wave current according to the direction and the extent of inclination of the horizontal axis of the display area 33 relative to the referential horizontal axis.

Figure 8A:
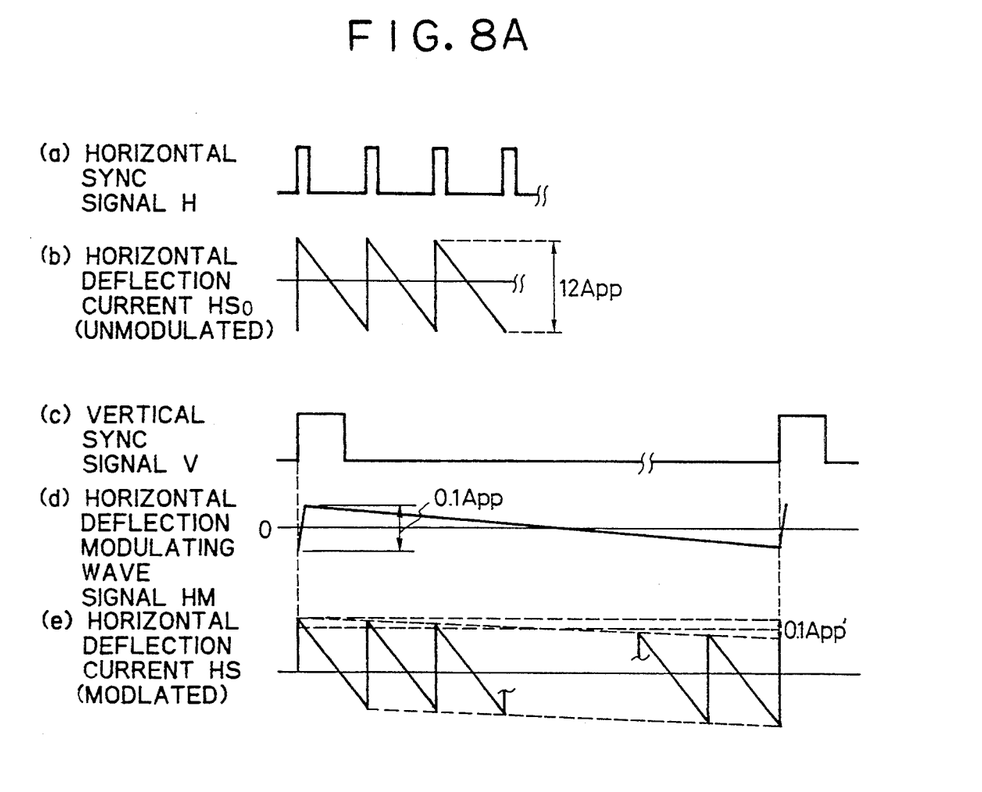
FIG. 8A is a diagram of waveforms at different circuit points, showing the operation of modulating a horizontal deflection current.
Figure 8B:
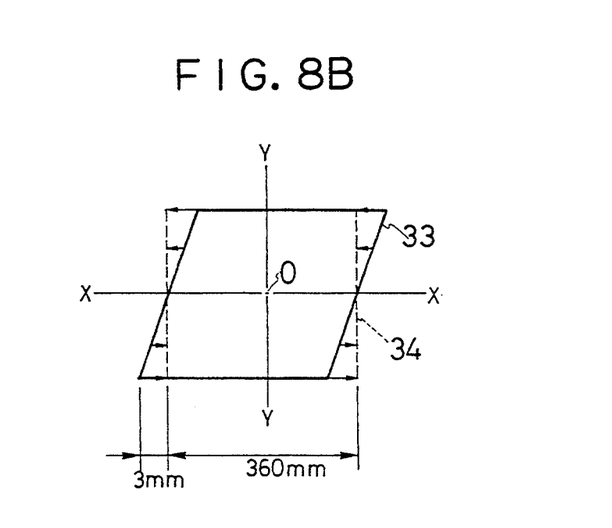
FIG. 8B is a diagram showing a displayed state of the display area.

FIGS. 8A and 8B are diagrams of correction of a parallellogramatic distortion which is caused in such a manner that the vertical axis of the display area 33 is rotated relative to the referential vertical axis Y—Y. FIG. 8A is a diagram of waveforms at different circuit points, showing the operation of modulating the horizontal deflection current HD. FIG. 8B is a diagram showing a displayed state of the display area 33. In this case, as illustrated in FIG. 8B, the parallellogramatic distortion is caused in such a manner that the display area 33 having a 270 mm vertical side and a 360 mm horizontal side is distorted in the horizontal direction so as to have a deviation of 3 mm at a vertical end position. This distortion can be removed by modulating the horizontal deflection current HD.

That is, if horizontal sync signal H formed of a pulse signal having a constant period (e.g., of 65 to 10 $\mu$s) as shown in (a) of FIG. 8A is input to the horizontal deflection circuit 11, the horizontal deflection circuit 11 outputs deflection current $HS_O$ having a saw-tooth referential waveform shown in (b) of FIG. 8A based on the horizontal sync signal H. If vertical sync signal V formed of a pulse signal having a constant period (e.g., of 20 to 10 ms) as shown in (c) of FIG. 8A is input to the horizontal deflection modulating wave generation circuit 12, the horizontal deflection modulating wave generation circuit 12 outputs modulating wave signal HC having a saw-tooth waveform such as that shown in (d) of FIG. 8(A). The amplitude of this modulating wave signal HC is adjusted, for example, to 0.1 App in terms of peak-to-peak level in correspondence with the above-mentioned inclination of 3 mm. This adjustment is effected by operating the slide resistor 17 of the adjustment circuit 16 so as to set a desired value of coefficient $K_1$. The modulating wave signal HC shown in FIG. 8A is controlled to have the polarity shown in (d) of FIG. 8A by setting a positive value of coefficient $K_1$. In a case where the vertical axis is inclined in the opposite direction, coefficient $K_1$ may be set to a negative value to invert the polarity of the waveform shown in (d).

When the modulating wave signal HC thus generated is supplied to the horizontal centering circuit 13, the deflection current $HS_O$ having the above-mentioned reference waveform is modulated by the modulating wave signal into a waveform, such as that shown in (e) of FIG. 8A, in which the modulating wave is superposed. All of a plurality of horizontal scanning lines of each electron beam are successively displaced in the horizontal direction by the superposed longer-period saw-tooth wave according to the amplitude of the modulating wave, so that the vertical axis of the display area 33 is rotated as indicated by the arrows in FIG. 8B. The direction and angle of this rotation depend upon the polarity and the amplitude of the superposed modulating wave. Consequently, it is possible to correct the inclination of the vertical axis of the display area 33 by selecting $K_1$ for the desired polarity and amplitude of the superposed modulating wave current according to the direction and the extent of inclination of the vertical axis of the display area 33 relative to the referential vertical axis.

The above-described operations may be combined in a vector synthesis manner to effectively remove rotational distortion which is caused in such a manner that the whole display area 33 is rotated on the screen center O.

As described above, rotational distortion can easily be removed even after the assembly of the image display apparatus by operating the slide resistor 17 according to the magnitude and the direction of rotation of the rotational distortion.

Figure 9:
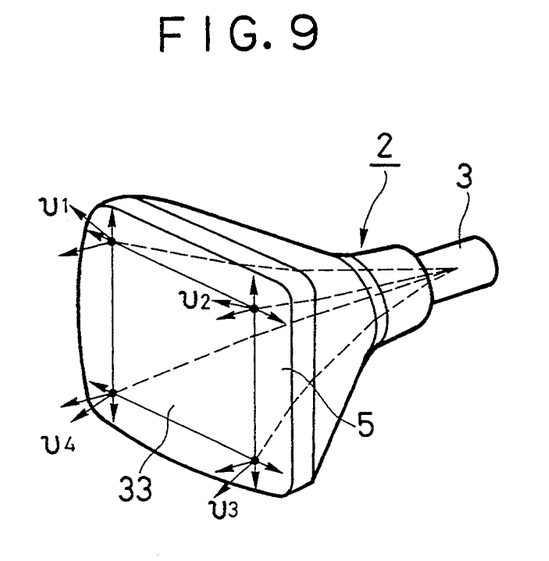
FIG. 9 is a diagram of the relationship between an electron beam emitted from a neck portion of the CRT toward a tube screen and velocity vectors at peripheral positions on the display area of the tube screen.
Figure 10A:
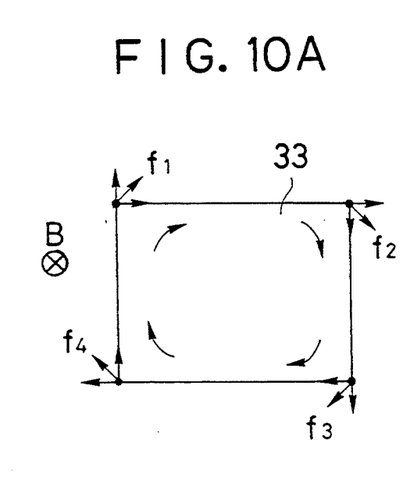
FIGS. 10A and 10B are diagrams of the influence of earth magnetism upon an image frame on the CRT.
Figure 10B:
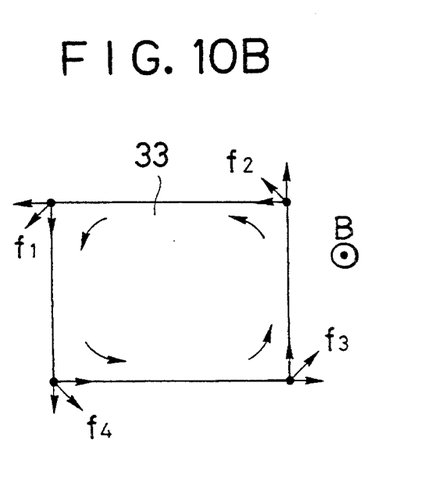

According to the present invention, it is also possible to remove a rotational distortion caused by the influence of a magnetic field, such as a magnetic field, caused by the earth's magnetism. Rotational distortion caused by such a magnetic field will be described below with reference to FIGS. 9 and FIGS. 10A and 10B. The CRT 2 displays an image by scanning electron beams with a magnetic field generated by the deflection yoke 4. Therefore the image formation can easily be influenced by an external magnetic field. Generally, it is easily influenced by the earth's magnetism. As shown in FIG. 9, an electron beam emitted toward the tube screen 5 from the electron gun of the CRT 2 has velocity vectors $V_1$, $V_2$, $V_3$, and $V_4$ at positions on the display area of the tube screen 5. If a magnetic field B, in a direction perpendicular to the screen, acts on this electron beam as shown in FIG. 10A or 10B, the electron beam is deflected in a direction according to the intensity and the direction of the magnetic field B by components in velocity vectors $V_1$, $V_2$, $V_3$ and $V_4$ perpendicular to the magnetic field B. By deflection forces $f_1$, $f_2$, $f_3$, and $f_4$ of these components, the whole display image is rotated as indicated by the arrows in FIG. 10A or 10B.

Generally, by considering such a rotational distortion due to a magnetism, CRT image display apparatuses are turned up before being forwarded so as to remove rotational distortions under a condition of earth magnetism in the forwarding place. However, if the direction in which a CRT image display is placed or the magnitude of earth magnetism is different from that in the place where the CRT image display has been turned up, a rotational distortion occurs. According to the present invention, such a distortion can also be corrected even after installation.

Figure 11:
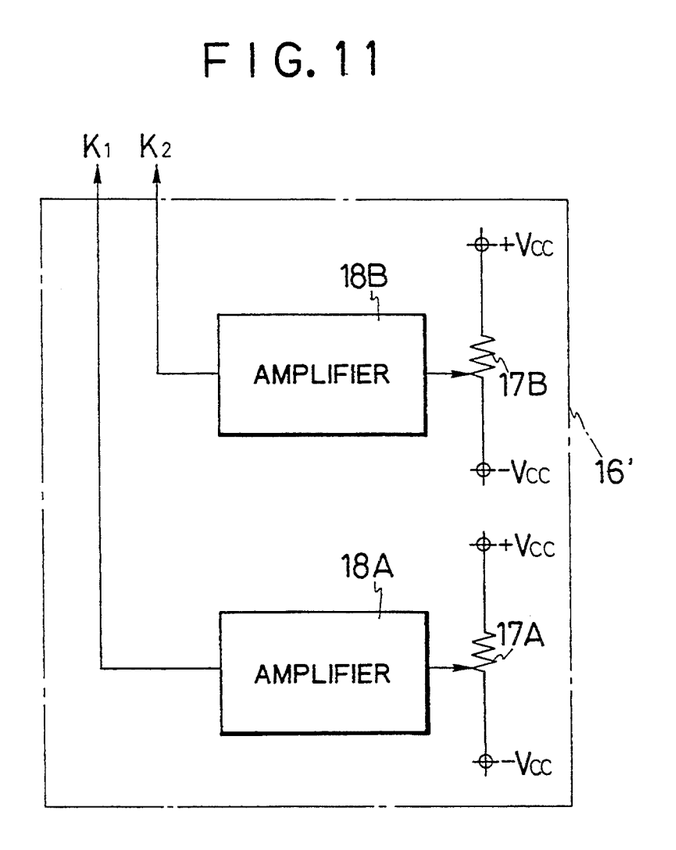
FIG. 11 is a diagram of an example of a modification of the adjustment circuit of the present invention.
Figure 12:
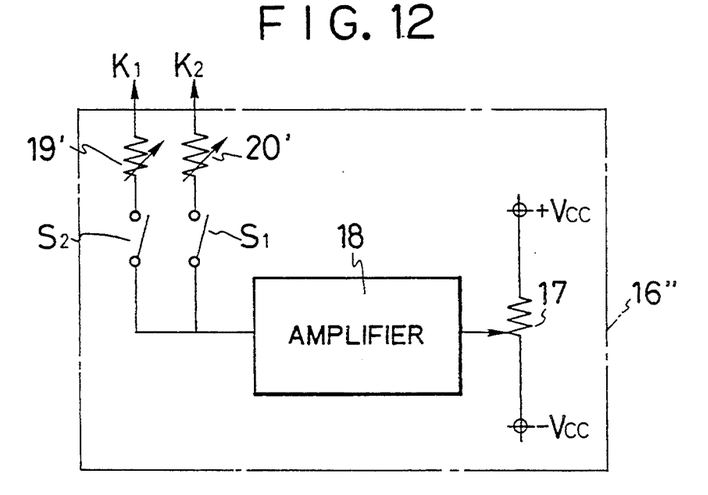
FIG. 12 is a diagram of another example of the modification of the adjustment circuit of the present invention.

FIGS. 11 and 12 show examples of modifications of the adjustment circuit 16. An adjustment circuit 16' shown in FIG. 11 has two sections provided independently for horizontal deflection modulation and vertical deflection modulation. An adjustment circuit 16" shown in FIG. 12 is arranged by replacing the resistors 19 and 20 of the adjustment circuit 16 shown in FIG. 1 with variable resistors 19' and 20' and by inserting switches $S_1$ and $S_2$ in these resistor circuits. By each of these circuits, parallellogramatic distortions shown in FIGS. 7B and 8B can be corrected or removed separately.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A deflection circuit for a CRT of an image display apparatus, said deflection circuit comprising:

a horizontal deflection circuit for supplying a saw-tooth horizontal deflection current to a horizontal deflection coil of said CRT in synchronization with a horizontal sync signal;

a vertical deflection circuit for supplying a saw-tooth vertical deflection signal to a vertical deflection coil of said CRT in synchronization with a vertical sync signal;

a modulating wave generation circuit for generating a saw-tooth modulating wave signal synchronized with said vertical sync signal and having the same period as said vertical sync signal; and an adjustment circuit for variably setting the polarity and the amplitude of said modulating wave signal;

wherein said horizontal deflection circuit superposes a saw-tooth wave current corresponding to said saw-tooth modulating wave signal output from said modulating wave generation circuit on said horizontal deflection circuit, wherein said horizontal deflection circuit includes a horizontal centering circuit for controlling a ground-side potential of said deflection coil to adjust a horizontal center of a displayed image frame, wherein a control output from said horizontal centering circuit is modulated by said modulating wave signal to superpose said saw-tooth current on said horizontal deflection current.

2. A deflection circuit for a CRT of an image display apparatus, said deflection circuit comprising:

a horizontal deflection circuit for supplying a saw-tooth horizontal deflection current to a horizontal deflection coil of said CRT in synchronization with a horizontal sync signal;

a vertical deflection circuit for supplying a saw-tooth vertical deflection signal to a vertical deflection coil of said CRT in synchronization with a vertical sync signal;

a first modulating wave generation circuit for generating a first saw-tooth modulating wave signal synchronized with said horizontal sync signal and having the same period as said horizontal sync signal and for outputting said first saw-tooth modulating wave signal to said vertical deflection circuit;

a second modulating wave generation circuit for generating a second saw-tooth modulating wave signal synchronized with said vertical sync signal and having the same period as said vertical sync signal and for outputting said second saw-tooth modulating wave signal to said horizontal deflection circuit; and an adjustment circuit for variably setting the polarity and the amplitude of each of said first and second saw-tooth modulating wave signals, wherein said horizontal deflection circuit includes a horizontal centering circuit for controlling a ground-side potential of said deflection coil to adjust a horizontal center of a displayed image frame, wherein a control output from said horizontal centering circuit is modulated by said second saw-tooth modulating wave signal to superpose said second saw-tooth current on said horizontal deflection current.

3. A deflection circuit for a CRT, comprising:

a picture signal amplifier for amplifying a video signal;

a CRT having an electron gun to which an output from said picture signal amplifier is supplied;

horizontal and vertical deflection coils for scanning an electron beam of said CRT;

a horizontal deflection circuit for supplying a saw-tooth horizontal deflection current to said horizontal deflection coil in synchronization with a horizontal sync signal;

a vertical deflection circuit for supplying a saw-tooth vertical deflection signal to said vertical deflection coil in synchronization with a vertical sync signal;

a first modulating wave generation circuit for generating a first saw-tooth modulating wave signal synchronized with said horizontal sync signal and having a same period as said horizontal sync signal and for outputting said first saw-tooth wave signal to said vertical deflection circuit;

a second modulating wave generation circuit for generating a second saw-tooth modulating wave signal synchronized with said vertical sync signal and having a same period as said vertical sync signal and for outputting said second saw-tooth wave signal to said horizontal deflection circuit; and an adjustment circuit for variably setting the polarity and the amplitude of each of said first and second modulating wave signals;

wherein said vertical deflection circuit superposes a first saw-tooth wave current corresponding to said first saw-tooth modulating wave signal to said vertical deflection current and said horizontal deflection circuit superposes a second saw-tooth wave current corresponding to said second saw-tooth modulating wave signal to said horizontal deflection current, wherein said horizontal deflection circuit includes a horizontal centering circuit for controlling a ground-side potential of said deflection coil to adjust a horizontal center of a displayed image frame, wherein a control output from said horizontal centering circuit is modulated by said second saw-tooth modulating wave signal to superpose said second saw-tooth current on said horizontal deflection current.

4. A deflection circuit for a CRT according to claim 3, wherein each of said first and second modulating wave generation circuits has a saw-tooth wave generation circuit for generating a saw-tooth wave synchronized with one of said horizontal and vertical sync signals and having the same periods of this sync signal, and a multiplier for multiplying an output from said saw-tooth wave generation circuit by a coefficient, and wherein said adjustment circuit comprises a circuit for variably setting the polarity and the magnitude of the coefficient of said multiplier.

5. A deflection circuit for a CRT according to claim 4, wherein said adjustment circuit includes a coefficient generation circuit for generating variable-level coefficient signals having polarities, and a coefficient distribution circuit for outputting said coefficients to said multipliers through switches and adjustment resistors.

6. An image display apparatus according to claim 5, wherein each of said adjustment resistors comprises a variable resistor.

7. A method of correcting a rotation distortion of an image frame on a CRT screen of an image display apparatus, said method comprising the steps of:

superposing a saw-tooth current, synchronized with a vertical sync signal and having the same period as said vertical sync signal on a saw-tooth horizontal deflection current caused to flow through a horizontal deflection coil of said CRT; and controlling polarity and amplitude of said superposed saw-tooth current according to the direction and the extent of inclination of a vertical axis of a displayed image relative to a differential vertical axis to correct said inclination of the vertical axis of said displayed image, wherein a horizontal deflection circuit includes a horizontal centering circuit for controlling a ground-side potential of said deflection coil to adjust a horizontal center of a displayed image frame, and further wherein a control output from said horizontal centering circuit is modulated by said modulating wave signal to superpose said saw-tooth current on said horizontal deflection current.

8. A method of correcting a rotation distortion of an image frame on a CRT screen of an image display apparatus, said method comprising the steps of:

superposing a first saw-tooth current, synchronized with a horizontal sync signal and having the same period as said horizontal sync signal on a saw-tooth vertical deflection current caused to flow through a vertical deflection coil of said CRT;

superposing a second saw-tooth current, synchronized with a vertical sync signal and having the same period as said vertical sync signal on a saw-tooth horizontal deflection current caused to flow through a horizontal deflection coil of said CRT; and controlling polarity and amplitude of each of the superposed first and second saw-tooth currents independently relative to a horizontal and a vertical referential position, respectively, according to the direction and the extent of a rotational distortion of a displayed to correct the rotational distortion of said displayed image, wherein a horizontal deflection circuit includes a horizontal centering circuit for controlling a ground-side potential of said deflection coil to adjust a horizontal center of a displayed image frame, and further wherein a control output from said horizontal centering circuit is modulated by said modulating wave signal to superpose said saw-tooth current on said horizontal deflection current.

* * * * *